Figure 1:
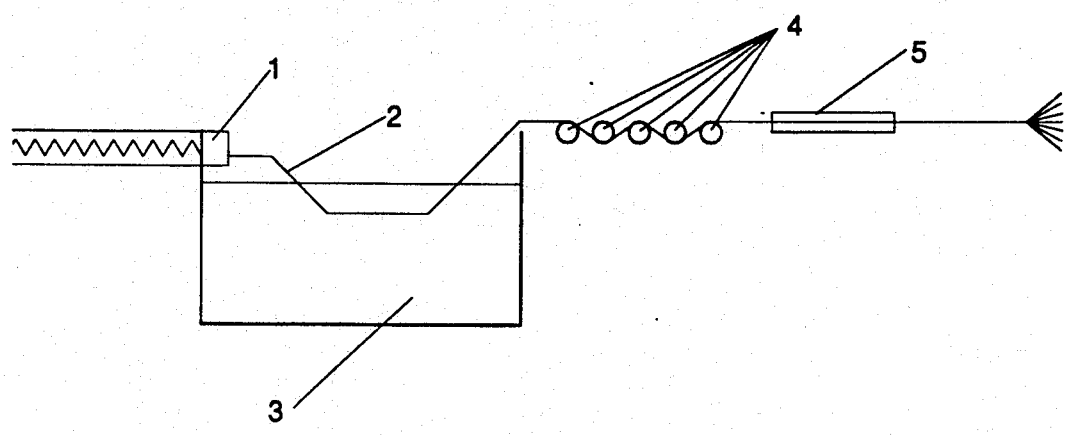

United States Patent [19]

Klein et al.

[11] Patent Number: 5,228,753
[45] Date of Patent: Jul. 20, 1993

[54] PROCESS FOR PRODUCING BRISTLE MATERIALS

[76] Inventors: Horst Klein, Schwarzwaldstr. 6, 6233 Kelkheim-Fischbach; Wolfgang Wiedemann, Am Ziegelbaum 31, 8706 Höchberg; Hans Klinger, Bachgarten, 8702 Rossbrunn, all of Fed. Rep. of Germany

[21] Appl. No.: 713,041

[22] Filed: Jun. 7, 1991

Related U.S. Application Data

[62] Division of Ser. No. 413,889, Sep. 28, 1989, abandoned.

[30] Foreign Application Priority Data

Oct. 1, 1988 [DE] Fed. Rep. of Germany ....... 3833428

[51] Int. Cl.$^5$ .................. A46D 1/05; D01D 10/00
[52] U.S. Cl. .................... 300/21; 264/162; 51/DIG. 17
[58] Field of Search ............ 300/21; 264/162, 178 F; 51/26, 317, 324, DIG. 17

[56] References Cited

U.S. PATENT DOCUMENTS

| 3,605,162 | 9/1971 | Long | 300/21 X |
| 4,839,199 | 6/1989 | de Jager | 427/185 |
| 4,958,402 | 9/1990 | Weihrauch | 15/159 A |

FOREIGN PATENT DOCUMENTS 2228123   5/1973   France.
8600-213-A  10/1986  Netherlands.

*Primary Examiner*—Frank T. Yost
*Assistant Examiner*—Rinaldi Rada
*Attorney, Agent, or Firm*—E. Kelly Linman; William Scott Andes

[57] ABSTRACT

The present invention relates to a process for producing bristle materials suitable for inserting into toothbrushes and based on synthetic fibres which have been roughened on their surface by mechanical action, in particular by means of a blast apparatus, the roughening being accomplished on the endless fibre strand after stretching. Using these bristle materials, toothbrushes with an improved plaque-removing action can be produced.

9 Claims, 1 Drawing Sheet

PROCESS FOR PRODUCING BRISTLE MATERIALS

This is a division of application Ser. No. 413,889, filed on Sep. 28, 1989, abandoned.

The present invention relates to a process for producing synthetic bristle materials suitable for inserting into toothbrushes, appropriately processed fibres for inserting into toothbrushes, and toothbrushes fitted with fibres processed in this way.

For cleaning the teeth and maintaining oral hygiene the use of manual or electrically operated toothbrushes is universally familiar. The cleaning is effected here by the individual bristles at the tooth surface and the abrasive bodies in the toothpaste. It is of decisive importance for the effectiveness and efficiency of a toothbrush how quickly and thoroughly the habitually unclean zones, i.e. inter-dental spaces, fissures and tooth necks, are freed from food residues and, in particular, plaque, which gives rise to caries and gum inflammations.

To improve the plaque-removing effect of a toothbrush, it has already been proposed that the individual bristles be roughened at their surface (CH-A 195,287). A more intensive and more complete cleaning of the teeth in the time generally devoted to cleaning the teeth is thereby possible.

According to the information in the CH-A mentioned, the roughening of the "animal bristles" described there, which is any case have an irregular surface, is preferably accomplished by the action of chemical means or "pressing between sharp-edged bodies". In a continuous process, uniform roughening cannot be achieved by such a procedure.

The invention therefore starts from the object of further developing such toothbrushes having bristles based on synthetic fibre materials and roughened on their surface in such a way that they can be efficiently produced by a modern production method and exhibit a uniform roughening of the surface.

The solution of this object consists in the fact that the fibres intended to inserting into toothbrushes are roughened in the form of an endless strand. This phase of the operation if preferably carried out immediately following the production of the fibre strand. In this procedure, the fibres, which are composed of plastic, preferably polyamides or polyesters, emerge in a manner known per se as an endless strand from the die of an extruder, are then passed through a water bath and then stretched on draw rolls arranged in series. Finally, the endless fibres are then brought together to form bristle bundles. For carrying out the roughening, a further station is interposed following the drawn roll installation, in which station the filaments are roughened mechanically at the surface. This roughening can be accomplished by the action of blast apparatus, by means of glass beads, abrasive bodies such as, for example, corundum and other aluminium oxides, carbides such as silicon carbide and boron carbide, nitrides, kieselguhr and sand, or alternatively by means of abrasive bodies in past or suspension form. It is also possible to achieve the roughening by the direct mechanical action of, for example, abrasive disks but the blast method is preferred since a gentler treatment is thereby possible. The endless fibres roughened in this manner are cut to length in a manner known per se for pressing into the brush heads and inserted in the latter. This can be accomplished by the customary methods by means of a metal fastening; however, welding to brush heads provided with recesses for accommodating the bristle bundles is also possible, as described, for example, in DE-A 3,403,341. The invention thus relates also to the fibre materials roughened in an endless strand and intended for producing toothbrushes, and to the toothbrushes which are fitted with such fibre materials and guarantee improved cleaning of the teeth.

Figure 2:
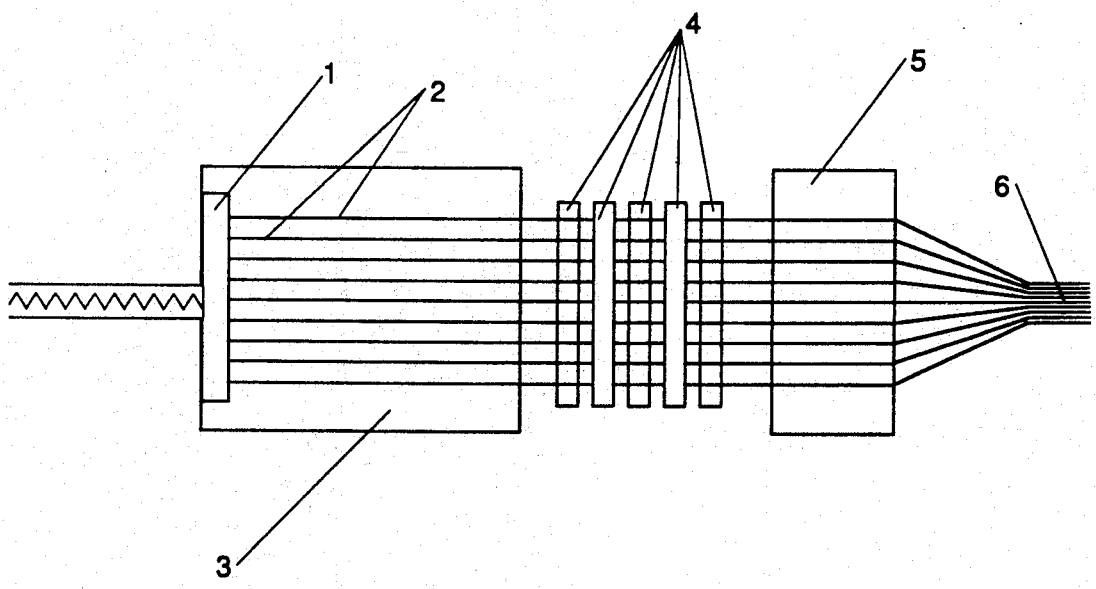

A diagramatic representation of an installation suitable for producing roughened toothbrush bristles in an endless strand is given in FIGS. 1 and 2. FIG. 1 represents a diagramatic cross-section and FIG. 2 represents a plan view of such an installation.

The plastic fibres (2) emerge from an extruder die (1), are passed through a water bath (3) and are then stretched by draw rolls (4) and, in the following operation, subjected to roughening. In the concrete exemplary embodiment, this is accomplished by treatment with a sand blast apparatus (5) but, as already explained, other suitable methods can also be used for roughening. Finally, the individual endless fibre strands are gathered into a fibre bundle (6) and are then delivered for further processing, i.e. insertion into the rush heads of toothbrushes.

We claim:

1. Process for producing continuous synthetic bristle material for use in a toothbrush, said bristle material having a uniformly roughened exterior surface, said process comprising the steps of:
   (a) extruding a continuous filament;
   (b) stretching said continuous filament by subjecting said continuous filament to tension; and
   (c) subjecting said exterior surface of said continuous filament to a mechanical abrasion process following said stretching step, said mechanical abrasion process being accomplished by passing said continuous filament continuously through a paste comprised of abrasive particles, whereby said exterior surface of said continuous filament is uniformly mechanically roughened.

2. The process of claim 1, including the step of cooling said continuous filament prior to said stretching step.

3. The process of claim 2, wherein said cooling is accomplished by passing said continuous filament through a water bath.

4. The process of claim 2 or 3, wherein said stretching step is accomplished by using draw rolls to exert tension on said continuous filament.

5. The process of claim 4, wherein said particles are selected from the group consisting of glass beads, corundum, aluminum oxides, carbides, nitrides, kieselguhr, and sand.

6. The process of claim 1, including the steps of:
   (a) forming said continuous filament into a bristle bundle following said mechanical abrasion process; and
   (b) securing said bristle bundle to a substrate to provide a cleaning implement.

7. The process of claim 6, wherein said bristle bundle is pressed into recesses provided in said substrate and secured to said substrate by welding.

8. The process of claim 6, wherein said bristle bundle is pressed into said substrate and secured to said substrate by mechanical means.

9. The process of claim 8, wherein said mechanical means comprises a metal fastening.

* * * * *